United States Patent
Sobue

(10) Patent No.: US 6,329,858 B1
(45) Date of Patent: Dec. 11, 2001

(54) CONTROL METHOD AND CONTROL SYSTEM FOR SIGNAL TRANSMISSION

(75) Inventor: Toshiharu Sobue, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/433,870

(22) Filed: Nov. 4, 1999

(30) Foreign Application Priority Data

Nov. 4, 1998 (JP) .................................. 10-312754

(51) Int. Cl.$^7$ ...................................................... H03H 11/16
(52) U.S. Cl. .......................... 327/231; 327/144; 327/233; 327/176
(58) Field of Search ..................................... 327/231, 232, 327/233, 234, 235, 230, 165, 166, 175, 176, 141, 144, 153, 161; 375/356, 373, 376

(56) References Cited

U.S. PATENT DOCUMENTS

| | | | |
|---|---|---|---|
| 4,222,009 | * 9/1980 | Moulton et al. | 327/156 |
| 4,272,690 | * 6/1981 | Riney et al. | 326/176 |
| 4,823,360 | * 4/1989 | Tremblay et al. | 327/165 |
| 5,168,182 | * 12/1992 | Salerno et al. | 327/175 |
| 5,864,250 | * 1/1999 | Deng | 327/165 |
| 5,999,023 | * 12/1999 | Kim | 327/144 |
| 6,100,737 | * 8/2000 | Heiles | 327/165 |

FOREIGN PATENT DOCUMENTS 2-197912    8/1990   (JP) .

\* cited by examiner

*Primary Examiner*—Timothy P. Callahan
*Assistant Examiner*—An T. Luu
(74) *Attorney, Agent, or Firm*—McGuireWoods LLP

(57) ABSTRACT

A control method and system are used for signal transmission when a data signal is transmitted between two circuits on the basis of a reference clock in a system. The sending side circuit transmits a clock signal together with the data signal to a clock transmission line of the same course with a data transmission line for the data signal by using a sender side reference clock. The receiving side circuit adjusts phases of the clock signal and the data signal at input points of transmission lines respectively so as to be in accordance with a receiver side reference clock. Then the receiving side circuit reads out data from an adjusted data signal by using an adjusted clock obtained by above the aforementioned adjusting step. The adjustment is performed comparing a phase of an adjusted clock with a phase of the receiver side reference clock. The second adjustment involves generating a feedback clock signal including a phase difference between the above signals. And the third one is to adjust phases of the sender side clock signal and the data signal respectively so as to accord with the receiver side reference clock, by using of the above feedback clock.

11 Claims, 5 Drawing Sheets

CONTROL METHOD AND CONTROL SYSTEM FOR SIGNAL TRANSMISSION

BACKGROUND OF THE INVENTION

This invention relates to a control method or a control system for signal transmission, which transmits a data signal on the basis of a reference clock between two circuits in such a device as a computer. Herein, it is to be noted that the control method or the control system is capable of easily and surely carrying out the signal transmission even in higher speeds data system.

Conventionally, methods and system for controlling signal transmission has such a problem that many receiving data which are transmitted especially over a long transmission line within a computer are incorrect. This is because, in a case where a long delay occurs to higher speed data with respect to a reference clock at a receiver side, a read timing by the reference clock can not accord with any data of data signals due to a long timing delay or big phase skew.

In order to remove the above-described problem, a clock skew adjustment system has been proposed in, for example, Japanese Unexamined Patent Publication No. Hei 2-197912, namely, 197912/1990.

Referring to FIG. 1, a reference clock A is supplied to and distributed in LSI-S (Large Scale Integration circuit of Sender side) 120 through a clock distribution gate 1 from a reference clock oscillator 10 in this system. Also, a reference clock B is supplied to and distributed in LSI-R (Large Scale Integration circuit of Receiver side) 130 through the clock distribution gate 1 from the reference clock oscillator 10 in the system.

Accordingly, data signals are transmitted from F/F (flip-flop circuit) 121 of LSI-S 120 on the basis of the reference clock A and received in F/F 131 of LSI-R 130 on the basis of the reference clock B. Generally, some skew occurs between phases of the reference clocks A and B respectively, because each transmission time is different in relation to the disposition between the clock distribution gate 1 and each of the LSI-S 120 and the LSI-R 130.

However, the reference clocks A and B can be arranged so as to be in accordance with phases corresponding to the disposition between the LSI-S 120 and the LSI-R 130 and distributed to each of a clock distributor 122 of the LSI-S 120 and a clock distributor 133 of the LSI-R 130.

Referring to a time chart illustrated in FIG. 2, in the case where phase skew does not occur between the reference clocks of LSI-S 120 and LSI-R 130, sure data transmission can be executed, because, data is surely received one after another from the data signal by each leading edge of the same phased clock in F/F 121, 131, and 132 respectively.

The reference clocks A and B can be arranged without any phase skew inside of each LSI. However, the phase skew occurs in the LSI-R 130 against the LSI-S 120 by reason of the transmission time of the data signal corresponding to the disposition between the LSI-S 120 and the LSI-R 130. Accordingly, the data signal sent from the F/F 121 may not surely be received by the clock timing in the LSI-R 130. Especially in the higher speed data, a short difference between phases will become relatively long and, as a result, the correctness in the data reception is degraded.

For the purpose of removing of the above described weak point, as illustrated in FIG. 1, a delay detector 123 in the LSI-S 120 and a delay detector 134 in the LSI-R 130 are supplied respectively. The delay detectors 123 and 134 are connected with a transmission line for delay time verification to have the same course of the transmission line of the data signal. Accordingly, it is capable of detecting any phase skew by reason of the transmission delay of the data signal to be transmitted from the LSI-S 120 to the LSI-R 130.

However, the conventional control method or control system described above requires much complicated control in order to surely transmit data signals at higher speeds in the case when the phase skew occurs by some delay timing on the data transmission line between the LSI-S and the LSI-R.

One of the reasons of the requirement for the complicated control is a necessity of clock distributors which accord to mutually phases of clocks distributed into the LSI-S and the LSI-R. Another reason is a necessity of a transmission line for delay time verification and a necessity of delay detectors which are connected to the transmission line. The transmission line is supplied between the LSI-S and the LSI-R, and the delay detectors detect phase skew by obtaining delay time of the data signal over the transmission line.

SUMMARY OF THE INVENTION

It is therefore an object of this invention to provide a control method or a control system, which is used for signal transmission over a data transmission line between two circuits and simply executes the sure signal transmission even if any higher speed system of data.

According to an aspect of this invention, a control method is used for signal transmission wherein a data signal is transmitted between two circuits on the basis of a reference clock inside of a system. The sending side circuit transmits a sender side clock signal together with the data signal to a clock transmission line of the same course with a data transmission line for the data signal by using of a sender side reference clock. The receiving side circuit adjusts phases of the sender side clock signal and the data signal at input points of the transmission lines respectively, so as to be in accordance with a receiver side reference clock. And the receiving side circuit reads out data from an adjusted data signal by using of an adjusted clock by above adjusting.

One of the detailed adjusting includes the followings. The first one is to compare a phase of an adjusted clock by above adjusting with a phase of the receiver side reference clock. The second one is to obtain a phase difference between above clocks compared by above comparing. And the third one is to adjust phases of the sender side clock signal and the data signal from the sender side circuit respectively so as to accord with the receiver side reference clock, by using of an output clock having the above phase difference.

According to another aspect of this invention, a control system for signal transmission comprises at least one of first flip-flop circuits and a second flip-flop circuit on a sender side circuit. And the control system further comprises at least one of first phase adjusters and a third flip-flop circuit corresponding to the first flip-flop circuits, and a second phase adjuster and a phase comparison circuit at least corresponding to the second phase adjuster, on a receiver side circuit.

At least one of first flip-flop circuits is used for transmitting the data signal to a data transmission line and a second flip-flop circuit is used for transmit a sender side clock signal to a clock transmission line, by using of a sender side reference clock. At least one of first phase adjusters corresponding to the first flip-flop circuits is used for adjusting a phase of the data signal over the data transmission line and a second phase adjuster is used for adjusting a phase of the sender side clock signal over the clock transmission line.

One of the phase comparison circuit receives an adjusted clock by the second phase adjuster and a receiver side reference clock. And the phase comparison circuit compares their clocks and then feeds back a feedback clock having a phase difference obtained by above comparing, to the first and second phase adjusters, in order to make the phase difference zero by using of the feedback clock. The third flip-flop circuit is used for reading out data from the adjusted data signal from the first phase adjuster by using of the adjusted clock from the second phase adjuster.

DESCRIPTION OF THE PREFERRED EMBODIMENTS

Hereafter, description will be made about embodiments of this invention with reference to the drawings.

Figure 1:
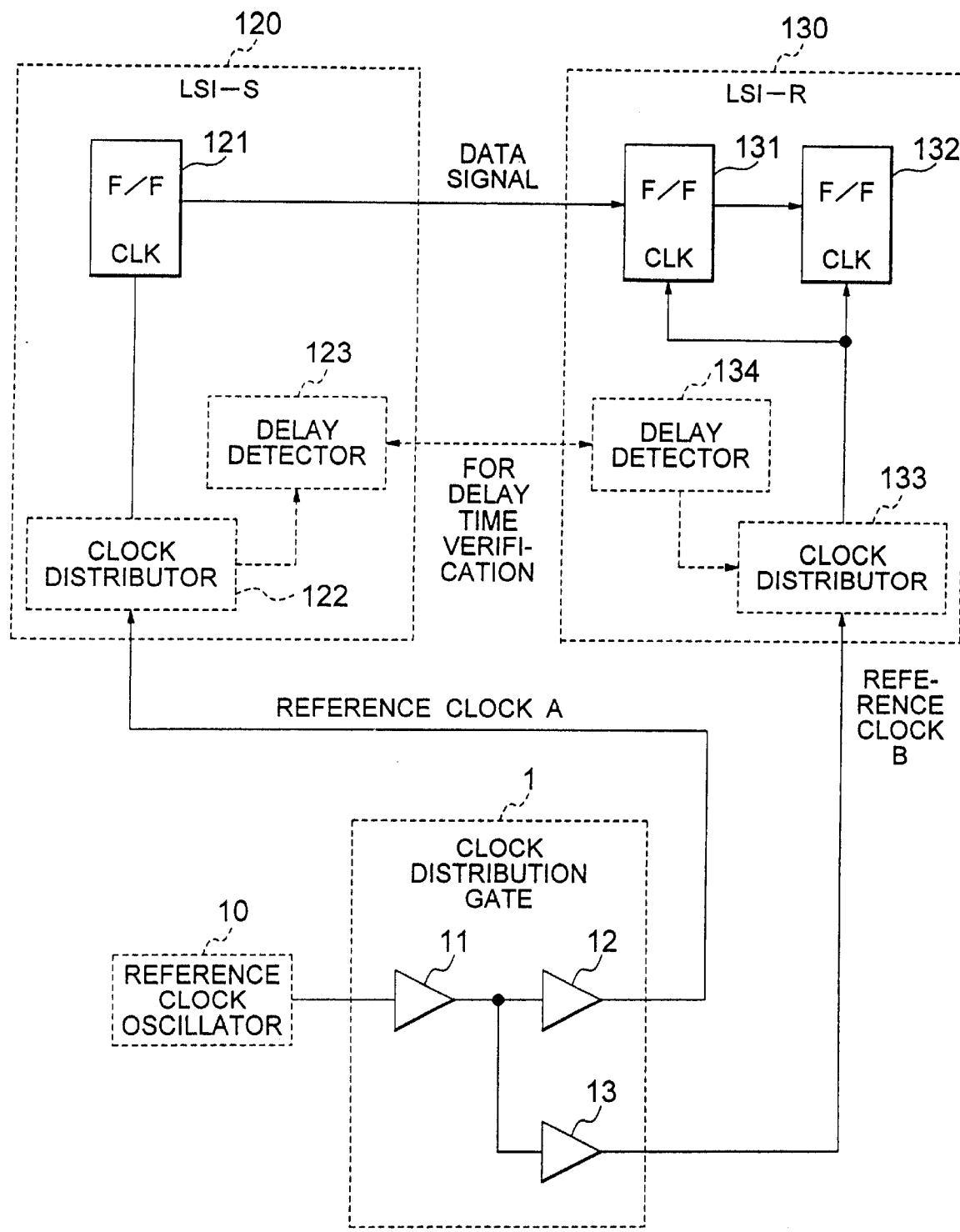
FIG. 1 is a block diagram of one example of a conventional control system.
Figure 2:
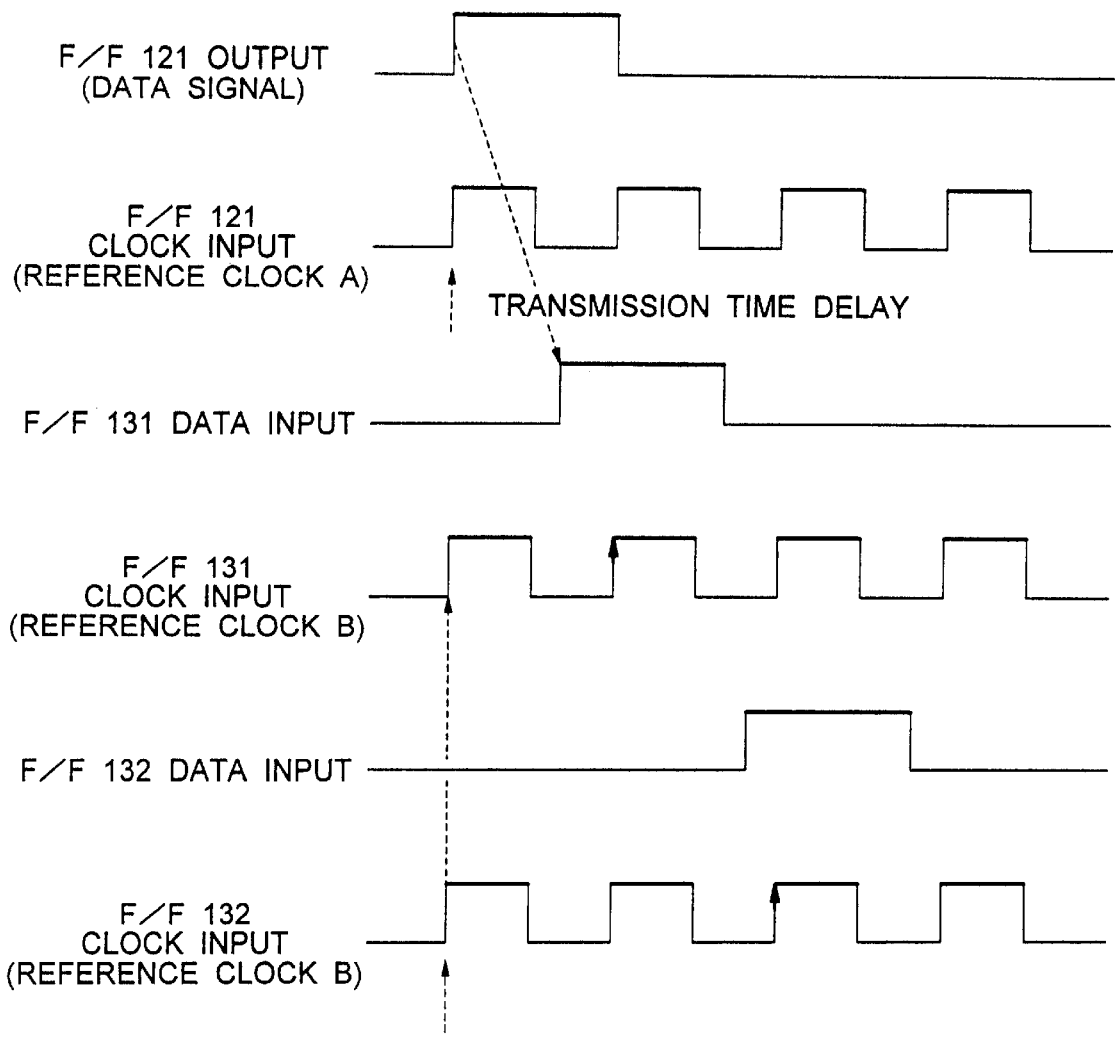
FIG. 2 is a time-chart for a flow of main signal transmitted in the control system illustrated in FIG. 1.
Figure 3:
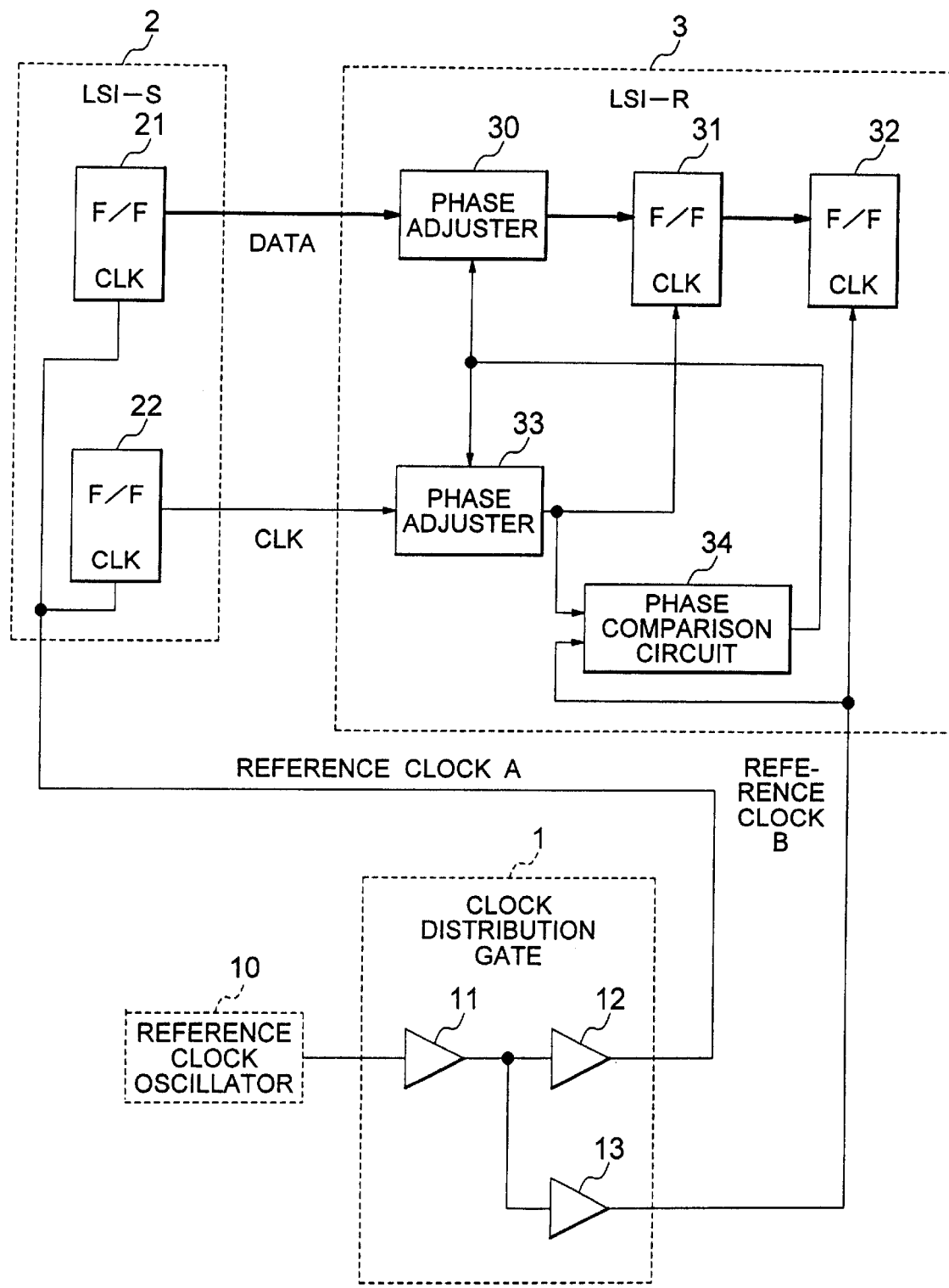
FIG. 3 is a block diagram of a control system according to a first embodiment of the invention.

Referring to FIG. 3, a control system according to a first embodiment of the invention is used to transmit data signal between two circuits inside of a system.

The control system illustrated in FIG. 3 comprises a clock distribution gate 1, an LSI-S (sending side LSI) 2, an LSI-R (receiving side LSI) 3, and a reference clock oscillator 10. The LSI-S 2 comprises two F/FS (flip-flop circuits) 21 and 22. The LSI-R 3 comprises two phase adjusters 30 and 33, two F/FS 31 and 32, and a phase comparison circuit 34.

In this system, the reference clock oscillator 10 distributes a reference clock A to the LSI-S 2 and a reference clock B to the LSI-R 3, through the clock distribution gate 1. A data signal is transmitted from the LSI-S 2 to the LSI-R 3 over a data transmission line.

In the LSI-S 2, the reference clock A is supplied to the F/FS 21 and 22, respectively. The F/F 21 transmits the data signal to the phase adjuster 30 over the data transmission line and the F/F 22 transmits the clock signal to the phase adjuster 33 over a clock transmission line, by using of the reference clock A. Both of the transmission lines for the data signal and the clock signal are disposed on the same course.

In the LSI-R 3, the data signal from the F/F 21 is input into the phase adjuster 30. The phase adjuster 30 adjusts a phase of the received data signal by using of a feedback clock from the phase comparison circuit 34 to make clock phase difference zero, and sends out an adjusted data signal to the F/F 31.

The clock signal from the F/F 22 is input into the phase adjuster 33. The phase adjuster 33 adjusts a phase of the received clock signal by using of the feedback clock, and transmits the adjusted clock to the phase comparison circuit 34 in order to make phase difference zero. And the phase adjuster 33 also transmits the adjusted clock output to the F/F 31 in order to read out data.

The reference clock B is supplied to the F/F 32 and the phase comparison circuit 34 respectively. The phase comparison circuit 34 receives the adjusted clock from the phase adjuster 33 and a reference clock B, and compares their phases. And then, the phase comparison circuit 34 feeds back the feedback clock having a phase difference value obtained by the comparison to the phase adjuster 33 in order to make phase difference zero. Accordingly, the phase comparison circuit 34 transmits the feedback clock to the phase adjusters 30 and 33 respectively.

By reason that each of the phase adjusters 30 and 33 receives the feedback clock having the same value of phase difference, the F/F 31 can surely receive data from the adjusted data signal by using of the feedback clock. Moreover, as each of the phase adjusters 30 and 33 adjusts an input signal in using of the feedback clock, an adjusted clock into the F/F 31 is able to have the same phase as the reference clock B. As a result, the F/F 32 can surely receive the data from the F/F 31.

Figure 4:
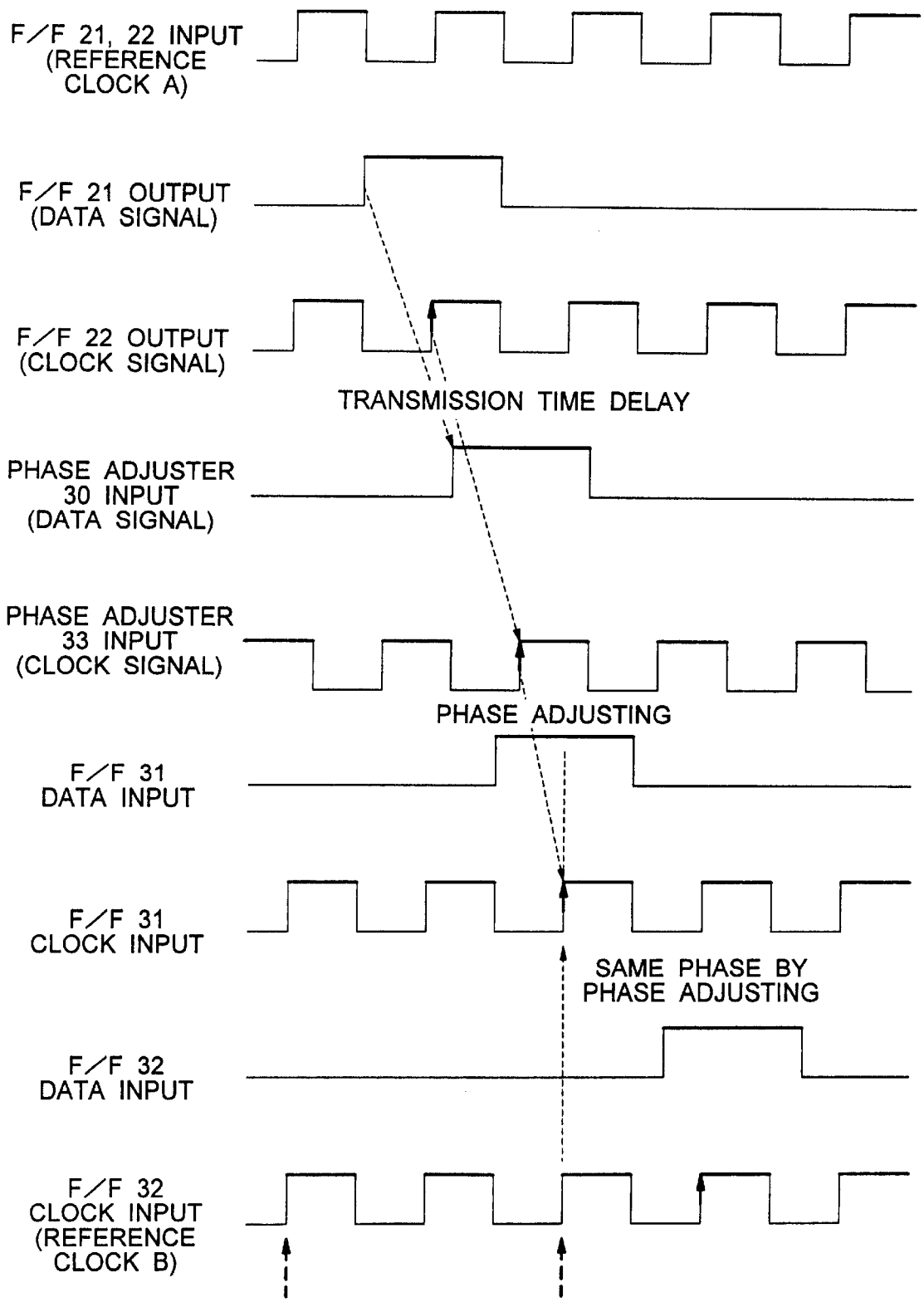
FIG. 4 is a time-chart for a flow of main signal transmitted in the control system illustrated in FIG. 3.

Referring to FIG. 4, description will be made about an example of a time-chart for a flow of main signal transmitted in the control system illustrated in FIG. 3.

At first, the reference clock A is supplied to the LSI-S 2 and the reference clock B is supplied to the LSI-R 3, respectively, through the clock distribution gate 1 from the reference clock oscillator 10.

The data signal and the clock signal from the F/F 21 and 22 are read out by leading edge of the reference clock A, respectively, and transmitted into the LSI-R 3 over the transmission lines with the same course as each other.

In the LSI-R 3, the phase adjusters 30 and 33 receive the data signal and the clock signal, respectively, from the LSI-S 2. Both transmitted signals in the LSI-R 3 have phases which are delay by transmission time against the reference clock A applied to the reading of the signals in the LSI-S 2 and then are almost the same ones, respectively.

Each of the phase adjusters 30 and 33 sends out a phase adjusted data signal and a phase adjusted clock to the F/F 31, respectively, by using of a feedback clock having a phase difference from the phase comparison circuit 34. Accordingly, the F/F 31 reads out data from the adjusted data signal of the phase adjuster 30 by using of the leading edge of the adjusted clock from the phase adjuster 33, with the same timing, and sends the data output to the F/F 32.

The adjusted clock into the F/F 31 has the same phase as the reference clock B by a feedback circuit formed by the phase adjuster 33 and the phase comparison circuit 34. Accordingly, data transmission is surely executed from the F/F 31 to the F/F 32.

Figure 5:
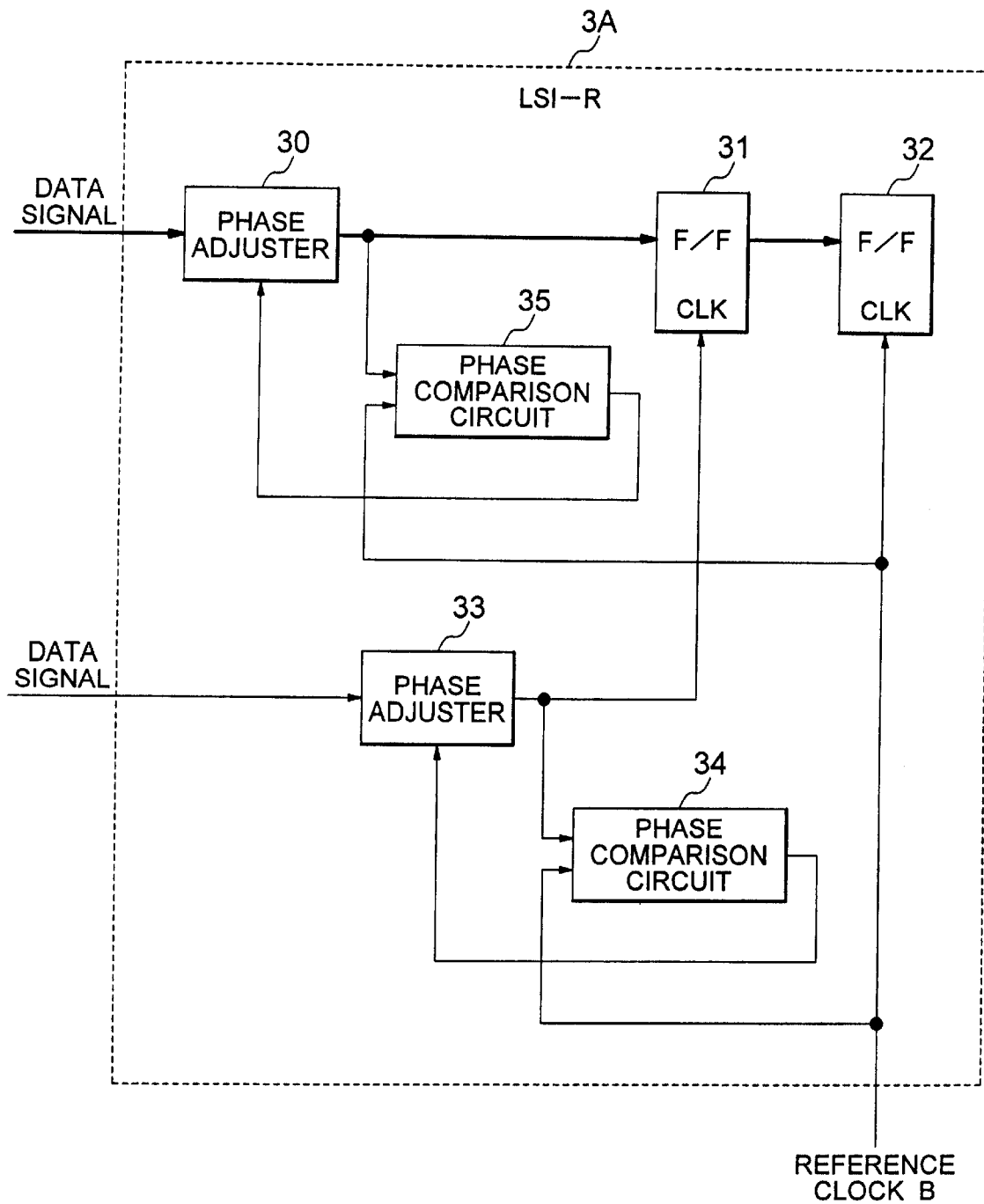
FIG. 5 is a block diagram of a control system according to a second embodiment of the invention

Referring to FIG. 5, description will be made about a control system according to the second embodiment being different from the above description in reference to FIG. 3.

The difference point from FIG. 3 is that a phase comparison circuit 35 further composes the control system and makes a feedback clock supplied to the phase adjuster 30, independently of the phase comparison circuit 34 for the phase adjuster 33.

Namely, the reference clock B is supplied to the F/F 32 and the phase comparison circuits 34 and 35 respectively. The phase comparison circuit 35 receives an adjusted data signal output from the phase adjuster 30 and a reference clock B and compares their phases. And then, the phase comparison circuit 35 feeds back a feedback clock including a phase difference obtained by above comparison to the phase adjuster 30 in order to make some preceding timing against the reference clock B by the phase difference.

Accordingly, the phase comparison circuit 35 transmits the feedback clock output to the phase adjusters 30 only, and the phase comparison circuit 34 transmits the feedback clock output to the phase adjusters 33 only.

The other components and the features are the same ones as described above in reference to FIG. 3.

As described above, the control system according to this invention is arranged the clock signal transmission line to the same course with the data signal transmission line between two circuits. And each of the data signal and the clock signal is transmitted from the sender side circuit by using of the sender side reference clock.

On the other hand, in the receiver side circuit, the phase adjusters adjust phases on the basis of the receiver side reference clock at receiving points from said sender side circuit. Furthermore, the phase adjuster and the phase comparison circuit form a feedback circuit, which functions so as to obtain the data phase to and has the same phase with the receiver side reference clock. And then, the receiver side circuit reads out the data from the data signal transmitted from the sender side circuit and sends them inside of the receiver side circuit.

A clock signal is transmitted over a transmission line for a clock signal on the same course as a transmission line for a data signal when the data signal is transmitted. Accordingly, the clock signal is able to have the almost same phase as the received data signal from a sender side circuit in a receiver side circuit. Moreover, a phase for reading of the data can make accord with a receiver side clock. That is, the input data can be read out by using of the receiver side clock, inside of the receiver side circuit.

Accordingly, such control method or control system can execute surely the data transmission, even in the higher speed. That is, the data are able to obtain surely from the data signal transmitted over the transmission line, in the receiver side circuit.

What is claimed is:

1. A control method used for signal transmission at a time when a data signal is transmitted between two circuits, comprising:

transmitting a clock signal with said data signal, said clock signal being transmitted on a clock transmission line and said data signal being transmitted on a data transmission line using a sender side reference clock signal in a sender side circuit, where said clock transmission line and said data transmission line follow a same course;

adjusting phases of said clock signal and said data signal at input points of the transmission lines respectively, so as to accord with a receiver side reference clock signal in a receiver side circuit.

2. A control method as recited in claim 1, wherein said control method further comprises:

reading out data from said adjusted phase data signal using said adjusted phase clock signal inside of said receiver side circuit.

3. A control method used for signal transmission at a time when a data signal is transmitted between two circuits, comprising:

transmitting a clock signal together with said data signal to a clock transmission line of a same course with a data transmission line for said data signal by using a sender side reference clock signal in a sender side circuit; and adjusting phases of said clock signal and said data signal at input points of the transmission lines respectively, so as to accord with a reference side reference clock signal in a receiver side circuit, wherein said adjusting step includes:

comparing a phase of said clock signal at a respective one of said input points with a phase of a receiver side reference clock signal;

obtaining a feedback clock signal including a phase difference between said signals compared by said comparison; and adjusting phases of said clock signal and said data signal in said sender side circuit respectively so as to accord with the phase of said receiver side reference clock signal, by using said feedback clock.

4. A control method used for signal transmission at a time when a data signal is transmitted between two circuits, comprising:

transmitting a clock signal together with said data signal to a clock transmission line of a same course with a data transmission line for said data signal by using a sender side reference clock signal in a sender side circuit; and adjusting phases of said clock signal and said data signal at input points of the transmission lines respectively, so as to accord with a reference side reference clock signal in a receiver side circuit, wherein said adjusting step includes:

a first step of comparing a phase of said clock signal received at one of said input points with a phase of a receiver side reference clock signal;

obtaining a first feedback clock signal including a phase difference between the signals compared in said first comparison step;

adjusting the phase of said clock signal received at said one of said input points so as to accord with the phase of said receiver side reference clock signal using said first feedback clock signal;

a second step of comparing a phase of said data signal received at the other one of said input points with the phase of said receiver side reference clock signal;

obtaining a second feedback clock signal including a phase difference between said received data signal and said receiver side reference clock signal compared in said second comparison step; and adjusting a phase of said received data signal so as to accord with the phase of said receiver side reference clock signal using said second feedback clock signal.

5. A control system, used for signal transmission at the time when a data signal is transmitted between two circuits, comprising:

a first flip-flop circuit, for transmitting said data signal to a data transmission line connected to said first flip-flop circuit using a sender side reference clock signal in a sender side circuit;

a second flip-flop circuit, for transmitting a clock signal to a clock transmission line connected to said second flip-flop circuit using said sender side reference clock signal in said sender side circuit;

a first phase adjuster, connected to said first flip-flop circuit, for adjusting a phase of said data signal received over said data transmission line so as to accord with a phase of a receiver side reference clock signal in a receiver side circuit; and a second phase adjuster, for adjusting a phase of said clock signal received over said clock transmission line so as to accord with a phase of said receiver side reference clock signal in said receiver side circuit.

6. A control system as claimed in claim 5, wherein said control system further comprises:

a phase comparison circuit, for comparing said clock signal received over said transmission line with said receiver side reference clock signal, and for the feeding back a feedback clock signal including a phase difference obtained by said comparison to said second phase adjuster in order to make a phase difference zero between said received clock signal and said receiver side reference clock signal and to said first phase adjuster to make a phase difference between said received data signal and said receiver side reference clock signal zero.

7. A control system as claimed in claim 6, said control system further comprising:

a third flip-flop circuit, for reading out data from said adjusted data signal from said first phase adjuster by using said adjusted clock signal from said second phase adjuster.

8. A control system as claimed in claim 5, wherein said control system further comprises:

a first phase comparison circuit, for comparing phases of said clock signal received from said transmission line and said receiver side reference clock signal, and for then feeding back a first feedback clock signal including a phase difference, obtained by comparing said phases of said received clock signal and said receiver side reference clock signal, to said second phase adjuster to accord said received clock signal with said receiver side reference clock signal in accordance with said phase difference; and a second comparison circuit, for comparing said received data signal and said receiver side reference clock, and for then feeding back a second feedback clock signal, including a phase difference, obtained by the comparing of said received data signal and said receiver side reference clock signal, to said first phase adjuster in order to make a phase difference between said received data signal and said receiver side reference clock signal zero.

9. A control system as claimed in claim 8, said control system further comprising:

a third flip-flop circuit, for reading out data from said adjusted data signal from said first phase adjuster by using said adjusted clock signal from said second phase adjuster.

10. A method for transmitting signals from a sender-side circuit to a receiver-side circuit, comprising:

transmitting a data signal over a data transmission line between said sender-side circuit and said receiver-side circuit;

transmitting a clock signal over a clock transmission line between said sender-side circuit and said receiver-side circuit, said clock signal transmitted over the clock transmission line at a same time said data signal is transmitted over the data transmission line, said clock transmission line and said data transmission line following a same course;

comparing, within said receiver-side circuit, a phase of said clock signal with a phase of a receiver-side reference clock signal to derive a phase difference signal; and adjusting a phase of said data signal in said receiver-side circuit to be in accordance with the phase of said receiver-side reference clock signal based on said phase difference signal.

11. A method according to claim 10, further comprising:

adjusting a phase of said clock signal based on said phase difference signal; and reading out data from said phase-adjusted data signal in accordance with said phase-adjusted clock signal.

* * * * *